United States Patent
Sayce-Jones

(10) Patent No.: US 7,467,035 B2
(45) Date of Patent: Dec. 16, 2008

(54) VEHICLE CONTROL SYSTEM WITH REDUNDANT STORAGE OF VEHICLE CONTROL PARAMETERS

(75) Inventor: Robin Sayce-Jones, Worchestershire (GB)

(73) Assignee: Haldex Brake Products Ltd. (GB)

( * ) Notice: Subject to any disclaimer, the term of this patent is extended or adjusted under 35 U.S.C. 154(b) by 753 days.

(21) Appl. No.: 10/847,741

(22) Filed: May 18, 2004

(65) Prior Publication Data

US 2005/0273231 A1    Dec. 8, 2005

(51) Int. Cl.
*G07F 7/00* (2006.01)
(52) U.S. Cl. .......................... 701/36; 701/37; 180/337; 260/274.1
(58) Field of Classification Search ............. 701/36–37, 701/48; 192/3.54, 215; 180/337; 280/124.1
See application file for complete search history.

(56) References Cited

U.S. PATENT DOCUMENTS

| | | | |
|---|---|---|---|
| 5,335,540 A | 8/1994 | Bowler et al. ............... | 73/146.5 |
| 5,463,374 A | 10/1995 | Mendez et al. ............... | 340/442 |
| 5,473,938 A | 12/1995 | Handfield et al. .......... | 73/146.5 |
| 5,540,092 A | 7/1996 | Handfield et al. .......... | 73/146.5 |
| 5,862,502 A * | 1/1999 | Giers .......................... | 701/71 |
| 5,963,128 A | 10/1999 | McClelland ................ | 340/447 |
| 6,252,498 B1 | 6/2001 | Pashayan, Jr. ............... | 340/447 |
| 6,447,075 B2 | 9/2002 | Ross et al. .................... | 303/20 |
| 6,476,712 B1 | 11/2002 | Achterholt .................. | 340/447 |
| 6,535,116 B1 | 3/2003 | Zhou .......................... | 340/447 |
| 6,728,611 B2 * | 4/2004 | Kamiya ........................ | 701/33 |
| 6,775,609 B2 * | 8/2004 | Ozeki et al. ................. | 701/114 |
| 6,823,251 B1 * | 11/2004 | Giers .......................... | 701/76 |

(Continued)

FOREIGN PATENT DOCUMENTS

DE          10251632 A1 *  6/2004

(Continued)

OTHER PUBLICATIONS

Semi-materialization: a performance analysis; Kamel, M.N.; Davidson, S.B.; System Sciences, 1991. Proceedings of the Twenty-Fourth Annual Hawaii International Conference on; vol. ii, Jan. 8-11, 1991 pp. 125-135 vol. 2; Digital Object Identifier 10.1109/HICSS. 1991.183972.*

(Continued)

*Primary Examiner*—Cuong H Nguyen
(74) *Attorney, Agent, or Firm*—St. Onge Steward Johnston & Reens LLC

(57) ABSTRACT

A control system for electronically controlled vehicle dynamics control systems and ride control systems includes a system ECU and a diagnostics ECU, each having a memory with vehicle parameters stored thereon. When one of the system ECU and the diagnostics ECU is replaced, the other one communicates via a communications link the vehicle parameters stored in the memory thereof to the replaced one of the system ECU and the diagnostics ECU. The vehicle parameters stored on at least one of the system ECU and the diagnostics ECU are user modifiable, and when the vehicle parameters stored on one of the system ECU and the diagnostics ECU are modified by a user, the one of the system ECU and the diagnostics ECU on which the vehicle parameters were modified communicates via the communications link the modified vehicle parameters to the other one.

8 Claims, 2 Drawing Sheets

U.S. PATENT DOCUMENTS

| | | | |
|---|---|---|---|
| 7,039,515 B2 * | 5/2006 | Eich et al. | 701/51 |
| 7,093,588 B2 * | 8/2006 | Edwards | 123/525 |
| 7,275,181 B2 * | 9/2007 | Staiger | 714/13 |
| 7,286,078 B2 * | 10/2007 | Mayer et al. | 342/70 |
| 2001/0037168 A1 * | 11/2001 | Hozuka et al. | 701/29 |
| 2002/0077739 A1 * | 6/2002 | Augsburger et al. | 701/115 |
| 2003/0050747 A1 * | 3/2003 | Kamiya | 701/33 |
| 2003/0060964 A1 * | 3/2003 | Ozeki et al. | 701/114 |
| 2004/0205386 A1 * | 10/2004 | Staiger | 714/6 |
| 2005/0273231 A1 * | 12/2005 | Sayce-Jones | 701/33 |
| 2006/0156076 A1 * | 7/2006 | Mayer et al. | 714/55 |

FOREIGN PATENT DOCUMENTS

| | | | |
|---|---|---|---|
| DE | 102004047176 A1 * | 4/2006 | |
| DE | 102006053617 A1 * | 5/2008 | |
| EP | 798456 A2 * | 10/1997 | |
| EP | 1643265 A1 * | 4/2006 | |
| GB | 2383983 B * | 8/2005 | |
| JP | 2005250894 A * | 9/2005 | |
| JP | 2006004377 A * | 1/2006 | |

OTHER PUBLICATIONS

Error recovery in shared memory multiprocessors using private caches; Wu, K.-L.; Fuchs, W.K.; Patel, J.H.; Parallel and Distributed Systems, IEEE Transactions on; vol. 1, Issue 2, Apr. 1990 pp. 231-240; Digital Object Identifier 10.1109/71.80134.*

5th Annual Magnetic Recording Conference (TMRC) in Signal Processing; Magnetics, IEEE Transactions on; vol. 31, Issue 2, Mar. 1995; Digital Object Identifier 10.1109/20.364762.*

ReVive: cost-effective architectural support for rollback recovery in shared-memory multiprocessors; Prvulovic, M.; Zheng Zhang; Torrellas, J.; Computer Architecture, 2002. Proceedings. 29th Annual International Symposium on; May 25-29, 2002 pp. 111-122; Digital Object Identifier 10.1109/ISCA.2002.1003567.*

A reusable microcontroller core's design; Janiszewki, I.; Baraniecki, R.; Siekierska, K.; Fall VIUF Workshop, 1999; Oct. 4-6, 1999 pp. 14-19; Digital Object Identifier 10.1109/VIUF.1999.801971.*

Power2: architecture and performance; White, S.W.; Compcon Spring '94, Digest of Papers; Feb. 28-Mar. 4, 1994; pp. 384-388; Digital Object Identifier 10.1109/CMPCON.1994.282902.*

Online elicitation of Mamdani-type fuzzy rules via TSK-based generalized predictive control; Mahfouf, M.; Abbod, M.F.; Linkens, D.A.; Systems, Man, and Cybernetics, Part B, IEEE Transactions on; vol. 33, Issue 3, Jun. 2003 pp. 465-475 Digital Object Identifier 10.1109/TSMCB.2003.810901.*

Smartapps, an application centric approach to high performance computing: compiler-assisted software and hardware support for reduction operations Dang, F.; Jesus Garzaran, M.; Prvulovic, M.; Ye Zhang; Jula, A.; Hao Yu; Amato, N.; Rauchwerger, L.; Torrellas, J.; Parallel and Distributed Processing Symposium., Proceedings International, IPDPS 2002.*

* cited by examiner

VEHICLE CONTROL SYSTEM WITH REDUNDANT STORAGE OF VEHICLE CONTROL PARAMETERS

FIELD OF THE INVENTION

The present invention relates generally to electronically controlled vehicle dynamics control systems and ride control systems, such as brake systems and suspension systems, which are intended for use with wheeled vehicles, and more particularly to a control scheme for controlling such systems which, in conjunction with an information display system, incorporates redundant storage of vehicle control parameters.

BACKGROUND OF THE INVENTION

Traditional vehicle dynamics control systems and ride control systems, such as brake systems and suspension systems, for motor vehicles include conventional hydraulically or pneumatically actuated components associated with two or more wheels of the vehicle. Such conventional components are actuated by pressurized fluid or compressed air. In the case of conventional brakes, for example, when actuated, the brakes exert a force on a disk or drum which spins in conjunction with the wheel of the vehicle in order to create frictional forces which resist rotation of the wheel. Traditionally, control signals have been transmitted to each of the vehicle dynamics control system's and/or ride control system's conventional components mechanically, or by a hydraulic or pneumatic control circuit. However, it has more recently been proposed to employ a centralized control unit to generate electronic control signals and to use such electronic control signals to control actuation of system components, such as brake actuators. This type of electronic control scheme has become even more prevalent in view of modern vehicle dynamics control systems and ride control systems which now often include not only conventional hydraulic or pneumatic actuator functionality, but also supplemental electronic functions such as antilock protection (ABS) and/or electronic braking force distribution (EBV) between the front and rear axles.

Such electronic control schemes are generally controlled by one or more electronic control units (ECUs), Which have a program running thereon which receives various inputs and generates electronic control signals which are supplied to each of the vehicle dynamics control system's and/or ride control system's conventional components. However, because of differences between vehicles and/or between requirements imposed by various jurisdictions or vehicle operators, it is often necessary for the ECU to employ vehicle specific parameters in generating the control signals. These vehicle specific parameters are typically initially installed into a configuration data memory of the ECU by a system builder using specialized equipment at the time of manufacture. However, this creates a problem in that if the ECU is subsequently required to be replaced due to failure or damage, the vehicle operator is normally required to re-enter specific system parameter settings into the memory of a replaced and unparameterized ECU.

U.S. Pat. No. 6,447,075 attempts to remedy this problem in the specific context of a vehicle braking system by providing a braking system which includes a braking ECU having an electronically operable control valve which derives suitably proportioned load and vehicle speed dependent service brake pressure for brake chambers of a trailer wheeled. The braking ECU has a data memory storing specific braking parameters normally installed therein prior to commissioning the trailer. The trailer has a further diagnostic ECU responsive to vehicle operational sensors, the further ECU also having memory capacity. The specific braking parameters are stored via a communication link consequent upon installation thereof to the braking ECU. Upon recognizing installation of a replacement braking ECU, the parameters from the diagnostic ECU are installed in the replacement ECU.

While this system does remedy the above-mentioned problem to some degree, it suffers from a number of disadvantages of its own. One such disadvantage arises due to the fact that when the further diagnostic ECU is installed, the braking parameters communicated by the braking ECU are permanently stored in the memory of the further diagnostic ECU. As such, it is impossible for the vehicle operator to modify the stored parameters should his/her requirements and/or the requirements of the jurisdiction in which the vehicle is operated change. For example, if the vehicle were moved from one jurisdiction to another jurisdiction having different requirements, it would be necessary to remove the diagnostic ECU from the system, modify the parameters stored on the braking ECU, and install a new diagnostic. ECU, which would then have the modified parameters from the braking ECU communicated thereto and stored thereon. If the vehicle were moved back to the original jurisdiction, this process would have to be repeated.

What is desired, therefore, is a control system for electronically controlled vehicle dynamics control systems and/or ride control systems which incorporates redundant storage of vehicle control parameters, which includes two memories for separately storing vehicle control parameters, which does not permanently store the vehicle control parameters in either memory, which allows for the vehicle control parameters to be modified, and which, when the vehicle control parameters stored in one of the memories is modified, automatically modifies the vehicle control parameters stored in the other memory.

SUMMARY OF THE INVENTION

Accordingly, it is an object of the present invention to provide a control system for electronically controlled vehicle dynamics control systems and/or ride control systems which incorporates redundant storage of vehicle control parameters.

Another object of the present invention is to provide a control system having the above characteristics and which includes two memories for separately storing vehicle control parameters.

A further object of the present invention is to provide a control system having the above characteristics and which does not permanently store the vehicle control parameters in either memory.

Still another object of the present invention is to provide a control system having the above characteristics and which allows for the vehicle control parameters to be modified.

Yet a further object of the present invention is to provide a control system having the above characteristics and which, when the vehicle control parameters stored in one of the memories is modified, automatically modifies the vehicle control parameters stored in the other memory.

These and other objects of the present invention are achieved in one embodiment by provision of a control system for electronically controlled vehicle dynamics control systems and ride control systems. The control system includes a system electronic control unit having a memory with vehicle parameters stored thereon, a display unit having a memory with vehicle parameters stored thereon, and a communications link by which the memory of the system electronic control unit and the memory of the display unit are communicable. When one of the system electronic control unit and the display unit is replaced, the other of the system electronic control unit and the display unit communicates via the communications link the vehicle parameters stored in the memory thereof to the replaced one of the system electronic control unit and the display unit. The vehicle parameters stored on at least one of the system electronic control unit and the display unit are user modifiable, and when the vehicle parameters stored on one of the system electronic control unit and the display unit are modified by a user, the one of the system electronic control unit and the display unit on which the vehicle parameters were modified communicates via the communications link the modified vehicle parameters to the other one of the system electronic control unit and the display unit.

In some embodiments, the system electronic control unit is adapted to receive control inputs and generate control signals responsive to the control inputs for controlling at least one system actuator. In some embodiments, the display unit is adapted to receive diagnostic inputs and to perform diagnostic calculations based at least in part on the diagnostic inputs. In certain embodiments, the vehicle parameters stored on both the system electronic control unit and the display unit are user modifiable.

In some embodiments, the control system controls an electronic braking system. In some embodiments, the control system further includes a display, and the display unit is adapted to receive diagnostic inputs, to perform diagnostic calculations based at least in part on the diagnostic inputs, and to display results of the diagnostic calculations on the display. In certain of these embodiments, the diagnostic inputs are received from tire pressure sensors and tire pressures are displayed on the display. In some embodiments, the control system controls electronically controlled vehicle dynamics control systems and ride control systems on a trailer.

In another embodiment of the present invention, a control system for an electronic brake system of a trailer includes a system electronic control unit having a memory with vehicle parameters stored thereon, the system electronic control unit adapted to receive control inputs and generate control signals responsive to the control inputs for controlling at least one brake system actuator, a display unit having a memory with vehicle parameters stored thereon, the display unit adapted to receive diagnostic inputs and to perform diagnostic calculations based at least in part on the diagnostic inputs, and a communications link by which the memory of the system electronic control unit and the memory of the display unit are communicable. When one of the system electronic control unit and the display unit is replaced, the other of the system electronic control unit and the display unit communicates via the communications link the vehicle parameters stored in the memory thereof to the replaced one of the system electronic control unit and the display unit. The vehicle parameters stored on the system electronic control unit and the display unit are user modifiable, and when the vehicle parameters stored on one of the system electronic control unit and the display unit are modified by a user, the one of the system electronic control unit and the display unit on which the vehicle parameters were modified communicates via the communications link the modified vehicle parameters to the other one of the system electronic control unit and the display unit.

In some embodiments, the control system further includes a display on which results of the diagnostic calculations are displayed. In certain of these embodiments, the diagnostic inputs are received from tire pressure sensors and tire pressures are displayed on the display.

In accordance with another aspect of the present invention, a method for controlling electronically controlled vehicle dynamics control systems and ride control systems includes the steps of storing vehicle parameters on a memory of a system electronic control unit, storing vehicle parameters on a memory of a display unit, replacing one of the system electronic control unit and the display unit, communicating via a communications link the vehicle parameters stored in the memory of the non-replaced one of the system electronic control unit and the display unit to the replaced one of the system electronic control unit and the display unit, modifying the vehicle parameters stored on one of the system electronic control unit and the display, and communicating via the communications link the modified vehicle parameters stored in the memory of one of the system electronic control unit and the display unit on which the vehicle parameters were modified to the other one of the system electronic control unit and the display unit.

In some embodiments, the method further includes the steps of receiving control inputs and generating control signals responsive to the control inputs with the system electronic control unit for controlling at least one system actuator. In some embodiments, the method further includes the steps of receiving diagnostic inputs and performing diagnostic calculations based at least in part on the diagnostic inputs with the display unit. In some embodiments, the method controls an electronic braking system.

In some embodiments, the method further includes the steps of receiving diagnostic inputs and performing diagnostic calculations based at least in part on the diagnostic inputs with the display unit, and displaying results of the diagnostic calculations on a display. In certain of these embodiments, the diagnostic inputs are received from tire pressure sensors and the step of displaying results of the diagnostic calculations on a display comprises the step of displaying tire pressures on the display. In some embodiments, the method controls electronically controlled vehicle dynamics control systems and ride control systems on a trailer.

The invention and its particular features and advantages will become more apparent from the following detailed description considered with reference to the accompanying drawings.

DETAILED DESCRIPTION OF AN EMBODIMENT OF THE INVENTION

Figure 1:
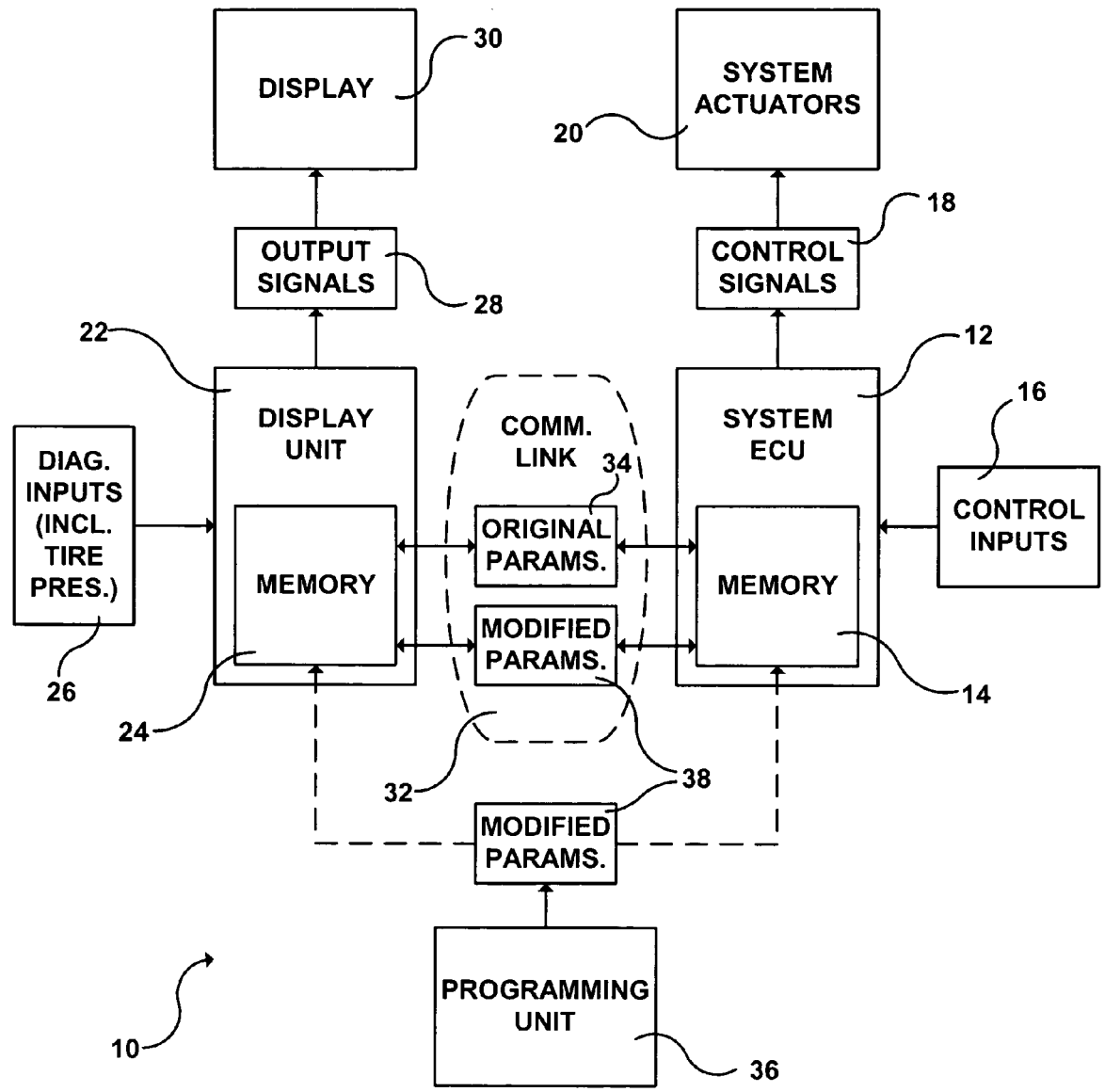
FIG. 1 is a schematic view of a control system for electronically controlled vehicle dynamics control systems and/or ride control systems in accordance with one embodiment of the present invention.

Referring first to FIG. 1, a control system 10 for electronically controlled vehicle dynamics control systems and/or ride control systems in accordance with one embodiment of the present invention is schematically shown. What is meant by "vehicle dynamics and ride control systems" is those systems of a vehicle which are responsible for control of the vehicle's movement and its interaction with the road. Examples of such systems include the electronic brake system (EBS), the antilock brake system (ABS), the suspension system, the traction control system, the anti-slip regulation (ASR) system, the steering system, the stability control system, the electronic stability program (ESP), the adaptive cruise control (ACC) system, various components of the diagnostics system, the trailer interface, the transmission, the air management control system, the continuous brake retarder, the engine control system, etc.

System 10 includes a system ECU 12 having a memory 14 with vehicle parameters stored thereon. System ECU 12 has a program running thereon (which may be embodied in software, hardware, firmware, etc.) which receives control inputs 16 and generates electronic control signals 18 which are supplied to each of the vehicle dynamics control system's and/or ride control system's actuators 20. Control inputs 16 may be received from various sensors (such as wheel speed sensors, pressure sensors, force sensors, position sensors, temperature sensors, friction sensors, acceleration sensors, power sensors, acceleration sensors, pitch sensors, vehicle height sensors, vehicle weight sensors) and/or various manual inputs manipulated by the vehicle operator (such as a brake pedal, gas pedal, gear shifter, steering wheel, emergency brake pedal, turn signal indicator, switches for performing various operations, etc.). System actuators 20 are associated with various components of a vehicle's vehicle dynamics and ride control systems, such as the brake system, the suspension system, the traction control system, the steering system, the stability control system, etc. System actuators 20 may be associated with different types of components within the same system or with components in different systems. For example, system actuators 20 may be associated with two different types of brake system components or may be associated with a brake system component and a suspension system component. In some embodiments, only one type of system actuator 20 (e.g., a brake actuator) is controlled.

Electronic control signals 18 generated by system ECU 12 are based at least in part upon control inputs 16 and at least in part upon the parameters stored in memory 14. Typically, the parameters stored in memory 14 are particular to the vehicle, to the vehicle operator and/or to the jurisdiction in which the vehicle is operated. It is also typical for the parameters to be stored in memory 14 of system ECU 12 at the time the vehicle is manufactured. The vehicle in question may be, for example, a car, a motorcycle, a truck, a tractor, a trailer, or any other motor vehicle. It had been found that system 10 is particularly well-suited for use with trailers.

System 10 also includes a diagnostics ECU 22 having a memory 24 with vehicle parameters stored thereon. The diagnostics ECU 22 is adapted to receive diagnostic inputs 26 and to perform diagnostic calculations based at least in part on diagnostic inputs 26. The diagnostic calculations may relate to substantially any vehicle condition, such as relating to operation of the brake system, the suspension system, the traction control system, the steering system, the stability control system, etc. The diagnostic calculations may relate to whether a particular system is operating properly or within certain limits, or may relate to monitoring the status of certain vehicle components. Examples of the latter include the pressure of the vehicle's tires, the wear of brake pads, the level of various fluids, etc. Preferably, the diagnostics ECU 22 is adapted to generate output signals 28 indicative of the results of the calculations performed thereby, and to display the results on a display device 30, such as an LCD screen or the like.

System 10 further includes a communications link 32 by which the memory 14 of the system ECU 12 and the memory 24 of the diagnostics ECU 22 are communicable. The communications link 32 may take the form of, for example, a data bus or a control network. As the operation of system ECUs and diagnostics ECUs are known in the art, operation of system ECU 12 and diagnostics ECU 22, and of the communication therebetween are not explained in further detail herein.

When one of the system ECU 12 and the diagnostics ECU 22 is replaced, the other of the system ECU 12 and the diagnostics ECU 22 communicates via the communications link 32 the vehicle parameters stored in the memory 14, 24 thereof to the replaced one of the system ECU 12 and the diagnostics ECU 22. In FIG. 1, these parameters are referred to as "original parameters" 34. By "original parameters" what is meant is that the parameters are those parameters currently stored on system ECU 12 or diagnostics ECU 22 when one is replaced, as opposed to "modified parameters" explained below.

For example, if one of the system ECU 12 or the diagnostics ECU 22 is damaged or destroyed, or an updated version of the system ECU 12 or the diagnostics ECU 22 becomes available, it can be replaced, and the unparameterized memory 14, 24 thereof will be automatically reprogrammed with the original parameters 34 already stored on the non-replaced ECU. It should also be noted that this communication of original parameters 34 also typically occurs when the diagnostics ECU 22 is first installed in system 10. As explained above, it is typical for the parameters to be stored in memory 14 of system ECU 12 at the time the vehicle is manufactured. If diagnostics ECU 22 is already installed, the original parameters 34 will be communicated from system ECU 12 to diagnostics ECU 22 at this time. However, it is also common for diagnostics ECU 12 to be installed at a later time. In this case, the original parameters 34 will be communicated from system ECU 12 to diagnostics ECU 22 at this later time when the diagnostics ECU 22 is first installed.

In accordance with the present invention, the vehicle parameters stored on at least one of the system ECU 12 and the diagnostics ECU 22 are modifiable by a user. Such modification may be accomplished by a programming unit 36 (such as a conventional CPU having specially adapted software executing thereon) being connected to one of the system ECU 12 or the diagnostics ECU 22 and "modified parameters" 38 being transmitted thereto for storage in the memory 14, 24 thereof. By "modified parameters" what is meant is that at least one of the parameters is different than those parameters currently stored on system ECU 12 and diagnostics ECU 22, as opposed to "original parameters" explained above. In some embodiments, the parameters stored on either one of the system ECU 12 and the diagnostics ECU 22 may be modified by a user (i.e., the programming unit 36 may be connected to either one of the system ECU 12 or the diagnostics ECU 22), while in other embodiments only the parameters stored on one of the system ECU 12 and the diagnostics ECU 22 may be modified by a user (i.e., the programming unit 36 may be connected to only one of the system ECU 12 or the diagnostics ECU 22). In certain embodiments, the former of these two options is preferred, as this allows for the programming unit 36 to be connected to whichever ECU is more easily accessible.

When the vehicle parameters stored on one of the system ECU 12 and the diagnostics ECU 22 are modified, the one of the system ECU 12 and the diagnostics ECU 22 on which the vehicle parameters were modified communicates via the communications link 32 the modified vehicle parameters 38 to the other one of the system ECU 12 and the diagnostics ECU 22 on which the parameters were not modified by the user. This advantageously allows the vehicle parameters stored on both the system ECU 12 and the diagnostics ECU 22 to be updated while only requiring the user to modify the vehicle parameters stored on one of the ECUs, rather than requiring the user to manually modify the vehicle parameters stored on both the system ECU 12 and the diagnostics ECU 22.

Figure 2:
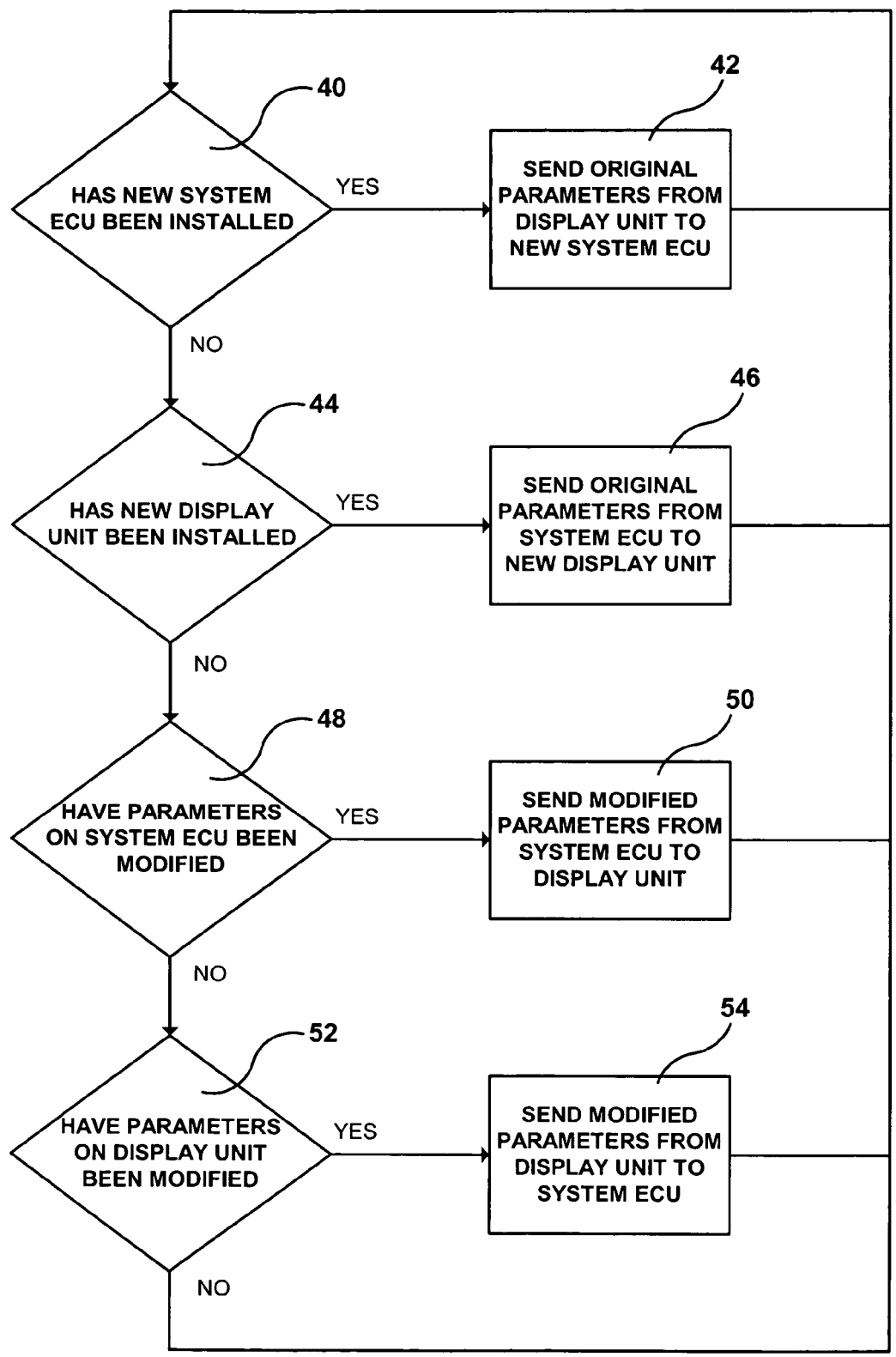
FIG. 2 is flowchart illustrating operation of the control system for electronically controlled vehicle dynamics control systems and/or ride control systems illustrated in FIG. 1.

Referring now to FIG. 2, operation of system 10 is schematically shown. At block 40, system 10 determines whether a new system ECU 12 has been installed, for example, if the previous system ECU 12 has been damaged or destroyed or if an updated version of the system ECU 12 is available. As illustrated at block 42, if a new system ECU 12 has been installed, original parameters 34 are communicated from diagnostics ECU 22 via communications link 32 to the new system ECU 12, which original parameters 34 are stored in memory 14 thereof. Operation of system 10 then continues from block 40.

If at block 40 it is determined that a new system ECU 12 has not been installed, system 10 determines at block 44 whether a new diagnostics ECU 22 has been installed. As illustrated at block 46, if a new diagnostics ECU 22 has been installed, for example, if the previous diagnostics ECU 22 has been damaged or destroyed, if a diagnostics ECU 22 is being installed for the first time, or if an updated version of the diagnostics ECU 22 is available, original parameters 34 are communicated from system ECU 12 via communications link 32 to the new diagnostics ECU 22, which original parameters 34 are stored in memory 24 thereof. Operation of system 10 then continues from block 40.

If at block 44 it is determined that a new diagnostics ECU 22 has not been installed, system 10 determines at block 48 whether parameters stored on system ECU 12 have been modified. As illustrated at block 50, if parameters stored on system ECU 12 have been so modified, the modified parameters 38 are communicated from system ECU 12 via communications link 32 to diagnostics ECU 22, which modified parameters 38 are stored in memory 24 thereof. Operation of system 10 then continues from block 40.

If at block 48 it is determined that parameters stored on system ECU 12 have not been modified, system 10 determines at block 52 whether parameters stored on diagnostics ECU 22 have been modified. As illustrated at block 54, if parameters stored on diagnostics ECU 22 have been so modified, the modified parameters 38 are communicated from diagnostics ECU 22 via communications link 32 to system ECU 12, which modified parameters 38 are stored in memory 14 thereof. Operation of system 10 then continues from block 40. If at block 52 it is determined that parameters stored on diagnostics ECU 22 have not been modified, operation of system 10 continues from block 40.

As should be understood by those skilled in the art, determination by system 10 of whether one of the system ECU 12 or the diagnostics ECU 22 has been replaced and/or whether the parameters stored on one of the system ECU 12 or the diagnostics ECU 22 have been modified may occur continuously, may occur periodically or from time to time, and/or may occur when system 10 detects an ECU replacement and/or a modification of vehicle parameters.

The present invention, therefore, provides a control system for electronically controlled vehicle dynamics control systems and/or ride control systems which incorporates redundant storage of vehicle control parameters, which includes two memories for separately storing vehicle control parameters, which does not permanently store the vehicle control parameters in either memory, which allows for the vehicle control parameters to be modified, and which, when the vehicle control parameters stored in one of the memories is modified, automatically modifies the vehicle control parameters stored in the other memory.

Although the invention has been described with reference to a particular arrangement of parts, features and the like, these are hot intended to exhaust all possible arrangements or features, and indeed many other modifications and variations will be ascertainable to those of skill in the art.

What is claimed is:

1. A control system for electronically controlled vehicle dynamics control systems and ride control systems, said control system comprising:
   a system electronic control unit having a memory;
   a display unit having a memory;
   vehicle parameters stored in the memory of said system electronic control unit and in the memory of said display unit;
   a communications link by which the memory of said system electronic control unit and the memory of said display unit are communicable;
   wherein when one of said system electronic control unit and said display unit is replaced, the other of said system electronic control unit and said display unit communicates via said communications link the vehicle parameters stored in the memory thereof to the replaced one of said system electronic control unit and said display unit;
   wherein the vehicle parameters stored on at least one of said system electronic control unit and said display unit are user modifiable; and
   wherein when the vehicle parameters stored on one of said system electronic control unit and said display unit are modified by a user, the one of said system electronic control unit and said display unit on which the vehicle parameters were modified communicates via said communications link the modified vehicle parameters to the other one of said system electronic control unit and said display unit.

2. The control system of claim 1 wherein said system electronic control unit is adapted to receive control inputs and generate control signals responsive to the control inputs for controlling at least one system actuator.

3. The control system of claim 1 wherein said display unit is adapted to receive diagnostic inputs and to perform diagnostic calculations based at least in part on the diagnostic inputs.

4. The control system of claim 1 wherein the vehicle parameters stored on both said system electronic control unit and said display unit are user modifiable.

5. The control system of claim 1 wherein said control system controls an electronic braking system.

6. The control system of claim 1 further comprising a display, and wherein said display unit is adapted to receive diagnostic inputs, to perform diagnostic calculations based at least in part on the diagnostic inputs, and to display results of the diagnostic calculations on the display.

7. The control system of claim 6 wherein the diagnostic inputs are received from tire pressure sensors and wherein tire pressures are displayed on the display.

8. The control system of claim 1 wherein said control system controls electronically controlled vehicle dynamics control systems and ride control systems on a trailer.

* * * * *